United States Patent [19]
Van Den Brink

[11] Patent Number: 5,401,955
[45] Date of Patent: Mar. 28, 1995

[54] OPTICAL NOISE SOURCE HAVING THREE INPUT SIGNALS

[75] Inventor: Robertus F. M. Van Den Brink, Leiden, Netherlands

[73] Assignee: Koninklijke PTT Nederland N.V., Groningen, Netherlands

[21] Appl. No.: 192,159

[22] Filed: Feb. 4, 1994

[30] Foreign Application Priority Data

Feb. 24, 1993 [NL] Netherlands ............. 9300347

[51] Int. Cl.⁶ ............................................. H01J 5/16
[52] U.S. Cl. ................. 250/227.11; 250/214 R; 324/613
[58] Field of Search ........... 250/227.11, 214 R, 214.1, 250/227.19; 340/555, 556, 557; 315/307, 297; 324/613, 620, 605; 307/355, 356, 357

[56] References Cited
U.S. PATENT DOCUMENTS

| | | | |
|---|---|---|---|
| 4,447,117 | 5/1984 | Bobb | 250/227.11 |
| 4,823,166 | 4/1989 | Hartog et al. | 250/227.19 |

FOREIGN PATENT DOCUMENTS

| | | |
|---|---|---|
| 0503579 | 9/1992 | European Pat. Off. |
| 58-003431 | 1/1983 | Japan |
| 60-182238 | 9/1985 | Japan |

OTHER PUBLICATIONS

R. F. M. van den Brink, et al., "Novel Noise Measurement Setup with High Dynamic Range for Optical Receivers", *Electronics Letters*, vol. 28, No. 7, Mar. 26, 1992, pp. 629–631.

*Primary Examiner*—David C. Nelms
*Assistant Examiner*—Que T. Le
*Attorney, Agent, or Firm*—Peter L. Michaelson

[57] ABSTRACT

Known optical noise sources are equipped with a light source and an interference filter, optically coupled thereto and based on path length difference, for generating an optical composition signal. If the spectrum of a photodiode to be illuminated with the optical composition signal is to be as flat as possible, said path length difference must be considerably greater than the coherence length of the light source which in present practice leads to disadvantageously large path length differences. By feeding, according to the invention, a noise signal to the light source, the coherence length of the light source decreases, as a result of which it is sufficient to use considerably smaller path length differences.

17 Claims, 1 Drawing Sheet

OPTICAL NOISE SOURCE HAVING THREE INPUT SIGNALS

A BACKGROUND OF THE INVENTION

The invention relates to an optical noise source comprising narrowband light source means for generating a modulated optical signal and provided with a base input for receiving an electrical periodic signal for modulating a narrowband optical signal, and an interference filter, based on path length difference, for receiving the modulated optical signal and for generating an optical composition signal.

Such an optical noise source is disclosed by an article "Measurement of frequency response of photoreceivers using self-homodyne method", by J. Wang, U. Krüger, B. Schwarz and K. Petermann, from "ELECTRONICS LETTERS" dated May 25, 1989, Volume 25, No. 11, pages 722, 723. This mentions narrowband light source means which comprise a laser diode (narrowband light source) for generating a narrowband optical signal. The anode (base input) of the laser diode is fed with a sinusoidal current (electrical periodic signal) with which the narrowband optical signal is modulated. Said modulated optical signal is fed to an interference filter which consists of two 3 dB couplers with, therebetween, two pieces of glass fibre having a mutual path length difference of approximately 1 km. The interference filter generates the optical composition signal which is composed of two mutually different frequency-modulated signals. As soon as a photodiode is illuminated with this optical composition signal, an electrical photodiode noise signal is produced whose (electrical) noise bandwidth is equal to the maximum instantaneous frequency difference between the two optical signals. If the spectrum of the electrical photodiode noise signal is to be as flat as possible within the chosen noise bandwidth (which is specified with the amplitude of the electrical periodic signal), the path length difference on which the interference filter is based must be considerably larger than the coherence length of the light source. Said coherence length, for the present-generation laser diodes, for example, is 10 meters and may increase to several kilometers for modern multi-section lasers.

This known noise source has the drawback that the interference filter needs to be based on a large path length difference (such as, for example, 1 kilometer).

B SUMMARY OF THE INVENTION

The object of the invention is, inter alia, to provide a noise source of the type mentioned in the preamble, in which it is sufficient to use an interference filter based on a considerably smaller path length difference (of, for example, 10 meters).

To this end, the noise source according to the invention is characterized in that the narrowband light source means are provided with a noise input for receiving an electrical noise signal.

By feeding the electrical noise signal to the narrowband light source means, the linewidth of the optical signal, which may or may not already have been modulated, increases, which corresponds to a decrease in the coherence length of the narrowband light source used, as a result of which it is sufficient to use an interference filter which is based on a smaller path length difference of, for example, a few meters.

The invention is based on the insight that the coherence length of a narrowband light source is inversely proportional to the linewidth of the optical signal of said light source, and that a large coherence length (and thus a small linewidth) requires a relatively large difference in delay time in the interference filter, if the spectrum of the electrical photodiode noise signal is to be as flat as possible over the chosen noise bandwidth. This relatively large difference in delay time in the interference filter is implemented by means of a large path length difference, and requires a relatively low modulation frequency in order to make the maximum instantaneous frequency difference between the interfering optical signals equal to the optical frequency swing. As a result, the noise bandwidth reaches a maximum, equal to the available optical frequency swing. By feeding the electrical noise signal to the narrowband light source means, the linewidth of the optical signal increases strongly, as a result of which it is sufficient to use a considerably smaller delay time and thus a much smaller path length difference.

It should be noted that it is known per se from EP 0,503,579 to widen the linewidth of the narrowband optical signal by feeding an electrical noise signal to narrowband light source means. It is not known therefrom, however, to reduce substantially, with the aid of this technique, the required path length difference in an interference filter, in which feeding in of the electrical noise signal may take place both before and after the modulation.

A first embodiment of the noise source according to the invention is characterized in that a bandwidth of the electrical noise signal is smaller than a frequency of the electrical periodic signal.

As a result of the electrical noise signal to be supplied to the narrowband light source means being limited in frequency, for example via a fourth-order low-pass filter, the concentration of noise power in the chosen noise bandwidth increases, owing to which noise power is handled more efficiently and less noise power is wasted outside the chosen noise bandwidth.

A second embodiment of the noise source according to the invention is characterized in that the electrical periodic signal is triangular.

Only part of the chosen noise bandwidth is sufficiently flat for using it to carry out noise measurements. A triangular electrical periodic signal results, compared to a sinusoidal electrical periodic signal having a comparable amplitude, in an electrical photodiode noise signal which can be considered as flat over a larger part of the noise bandwidth.

A third embodiment of the noise source according to the invention is characterized in that the optical noise source comprises an optical detector for detecting at least a part of the optical composition signal, which optical detector is coupled, via a filter, to an input of the narrowband light source means.

By feeding back part of the optical composition signal, the optical signal coming from the narrowband light source means is stabilized, which is of great importance for certain measurements.

A fourth embodiment of the noise source according to the invention is characterized in that the filter is a high-pass or bandpass filter with which an electrical detector is cascaded for controlling the electrical periodic signal, the input of the narrowband light source means being the base input.

The (positive) feedback via a bandpass or high-pass filter and a detector for controlling the electrical periodic signal stabilizes the spectral noise density of the electrical photodiode noise signal. Controlling in this case may comprise regulating the amplitude and/or regulating the frequency of the electrical periodic signal.

A fifth embodiment of the noise source according to the invention is characterized in that the filter is a low-pass filter for regulating a power level of the optical signal, the input of the narrowband light source means being a power input.

The (negative) feedback via a low-pass filter of a direct-current component of the optical composition signal, to regulate a power level of the optical signal to be generated by the narrowband light source means, stabilizes said power level. It is already known per se to feed back the optical output of a light source directly for the purpose of stabilization, without involving the interference filter. A separate circuit, required in this case for stabilizing the interference filter, such as, for example, polarization control, becomes unnecessary in the case of this fifth embodiment.

It is obviously of further advantage if the fourth and fifth embodiment are used in combination.

A sixth embodiment of the light source according to the invention is characterized in that the narrowband light source means comprise an optical input for receiving the narrowband optical signal.

In this embodiment, the narrowband light source means therefore do not comprise a light source but are fed with the narrowband optical signal via the optical input.

A seventh embodiment of the noise source according to the invention is characterized in that the narrowband light source means comprise an optical modulator which is optically coupled to the optical input and of which an input forms the base input.

Via said optical modulator, which is fed with the electrical periodic signal, the narrowband optical signal received via the optical input is modulated in frequency. Obviously other forms of argument modulation are likewise possible, such as, for example, phase modulation.

An eighth embodiment of the noise source according to the invention is characterized in that the narrowband light source means comprise an optical modulator which is optically coupled to the optical input and of which an input forms the noise input.

Via said optical modulator, which is fed with the electrical noise signal, the narrowband optical signal received via the optical input is modulated in frequency with said electrical noise signal. This can take place both before and after the narrowband optical signal is frequency-modulated with the electrical periodic signal. Obviously other forms of argument modulation are likewise possible, such as, for example, phase modulation.

It is obviously of further advantage if both the said modulators are used simultaneously or are combined into one modulator.

A ninth embodiment of the noise source according to the invention is characterized in that the narrowband light source means comprise an optical amplitude modulator which is optically coupled to the optical input and of which an input forms a power input.

Via this optical modulator, which is fed with an electrical DC signal, the narrowband optical signal received via the optical input is amplitude-modulated with said electrical DC signal. This is done to adjust the power level of the narrowband optical signal to be generated by the narrowband light source means. This can take place both before and after the narrowband optical signal is frequency-modulated with the electrical periodic signal and is modulated with the electrical noise signal.

A tenth embodiment of the noise source according to the invention is characterized in that the narrowband light source means comprise a narrowband light source for generating the narrowband optical signal.

In this embodiment, the narrowband light source means therefore comprise the narrowband light source which generates the narrowband optical signal.

An eleventh embodiment of the noise source according to the invention is characterized in that the narrowband light source means comprise an optical modulator which is optically coupled to the narrowband light source and of which an input forms the base input.

Via this optical modulator, which is fed with the electrical periodic signal, the narrowband optical signal to be generated by the narrowband light source is frequency-modulated.

A twelfth embodiment of the noise source according to the invention is characterized in that the narrowband light source means comprise an optical modulator which is optically coupled to the narrowband light source and of which an input forms the noise input.

Via this optical modulator, which is fed with the electrical noise signal, the narrowband optical signal to be generated by the narrowband light source is modulated with said electrical noise signal. This may take place both before and after the narrowband optical signal is frequency-modulated with the electrical periodic signal.

It is obviously of further advantage if both the said modulators are used simultaneously or are combined into one modulator.

A thirteenth embodiment of the noise source according to the invention is characterized in that the narrowband light source means comprise an optical amplitude modulator which is optically coupled to the input of the narrowband light source and of which an input forms a power input.

Via this optical modulator, which is fed with an electrical DC signal, the narrowband optical signal received via the optical input is amplitude-modulated with said electrical DC signal. This is done to adjust the power level of the narrowband optical signal to be generated by the narrowband light source means. This can take place both before and after the narrowband optical signal is frequency-modulated with the electrical periodic signal and is modulated with the electrical noise signal.

A fourteenth embodiment of the noise source according to the invention is characterized in that the narrowband light source is provided with an input which forms the base input.

In this case, the narrowband light source is itself provided with the base input, thus saving a modulator.

A fifteenth embodiment of the noise source according to the invention is characterized in that the narrowband light source is provided with an input which forms the noise input.

In this case, the narrowband light source is itself provided with the noise input, thus saving a modulator.

A sixteenth embodiment of the noise source according to the invention is characterized in that the narrowband light source is provided with an input which forms a power input.

In this case, the narrowband light source is itself provided with the power input, thus saving an amplitude modulator.

C References

"Measurement of frequency response of photoreceivers using self-homodyne method", by J. Wang, U. Krüger, B. Schwarz and K. Petermann, from "ELECTRONICS LETTERS", dated May 25, 1989, Vol. 25, No. 11, pages 722, 723.

"Novel noise measurement setup with high dynamic range for optical receivers", by R. F. M. van den Brink, E. Drijver and M. O. van Deventer, from "ELECTRONICS LETTERS" dated Mar. 26th, 1992, Vol. 28, No. 7, pages 629, 630.

EP 0,503,579

All the references mentioned are regarded as being incorporated into the present patent application.

BRIEF DESCRIPTION OF THE DRAWINGS

D Illustrative embodiment

The invention will be explained in more detail with reference to illustrative embodiments depicted in the figures, in which.

Figure 1:
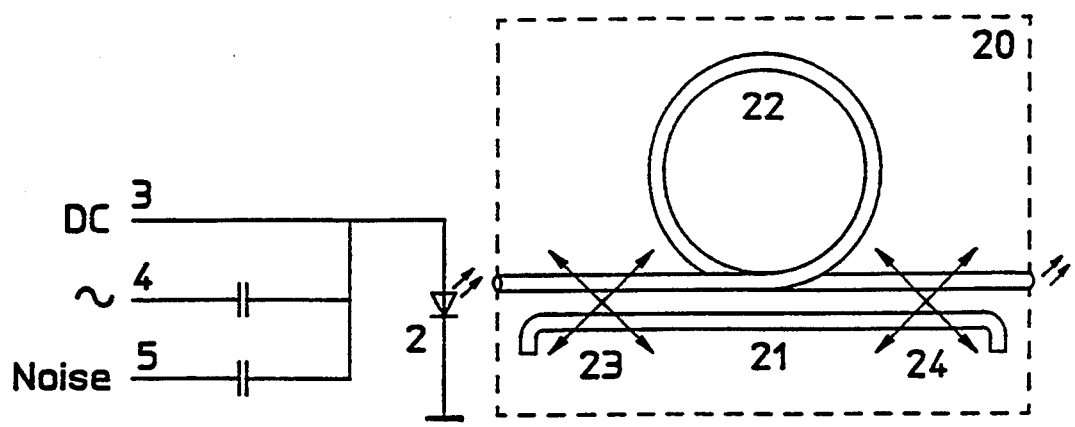
FIG. 1 shows a first optical noise source according to the invention.

The first optical noise source depicted in FIG. 1 comprises a narrowband light source 2 such as, for example, a laser diode, of which the cathode is connected to ground and of which the anode forms a power input 3 for receiving an electrical DC signal. Said anode further forms, via a first capacitor, a base input 4 for receiving an electrical periodic signal (such as, for example, a sinusoidal signal for the purpose of frequency modulation of a narrowband optical signal to be emitted by the narrowband light source 2) and further forms, via a second capacitor, a noise input 5 for receiving an electrical noise signal. The first optical noise source depicted in FIG. 1 further comprises an interference filter 20, based on path length difference, for receiving the modulated optical signal and for generating an optical composition signal. Said interference filter 20 comprises, for example, a first glass fibre 21 and a second glass fibre 22 which has a greater length than glass fibre 21. Both glass fibres 21, 22 are coupled to one another at a receiving side via a 3 dB coupler 23 and are coupled to one another, at an emitting side, via a 3 dB coupler 24. In said first optical noise source depicted in FIG. 1, the narrowband light source 2 forms the narrowband light source means.

By means of a DC signal to be fed to power input 3, the power of the light source 2 is adjusted, and by means of the periodic signal to be fed to base input 4, the optical signal is modulated. In this arrangement, a small variation of the laser diode current will simultaneously cause both a variation in the optical power and a low parasitic variation in the optical frequency. The modulated optical signal is split in the 3 dB coupler 23 in the interference filter 20. Owing to the optical signals thus split off each covering a different path length in the glass fibres 21, 22 and then being combined in the 3 dB coupler 24, the interference filter 20 generates the composition signal which is formed by two different frequency-modulated optical signals. If a measurement object such as, for example, a photodiode is illuminated with said optical composition signal, an electrical photodiode noise signal is produced whose (electrical) noise bandwidth is equal to the largest instantaneous frequency difference between the optical signals at the ends of the glass fibres 21, 22. Said frequency difference is at a maximum if the period of the electrical periodic signal is chosen to be equal to twice the delay time of the interference filter 20.

If the spectrum of the electrical photodiode noise signal is to be as flat as possible within the chosen noise bandwidth (which is specified by the amplitude of the electrical periodic signal), the path length difference on which the interference filter 20 is based must be considerably greater than the coherence length of the light source 2. By feeding the noise signal to the noise input 5, the linewidth of the optical signal increases, which corresponds to a decrease in the coherence length of the light source 2, as a result of which it is sufficient to use a shorter delay time and thus a smaller path length difference in the interference filter 20 and thus a higher modulation frequency of the periodic signal. Consequently, the required path length difference in the interference filter decreases substantially, which is of great advantage in various respects (such as costs and handling). If the laser diode 2 is a modern multi-section laser which can more readily be frequency-modulated than, for example, a DFB (distributed feedback) laser and which is equipped with separate inputs for power modulation and frequency modulation, a variation in the optical frequency will be associated with a considerably smaller parasitic variation in the optical power, which is obviously advantageous. Without the noise signal being fed in, the desired path length difference in the interference filter 20, when using this modern multi-section laser, would have become unacceptably large.

Figure 2:
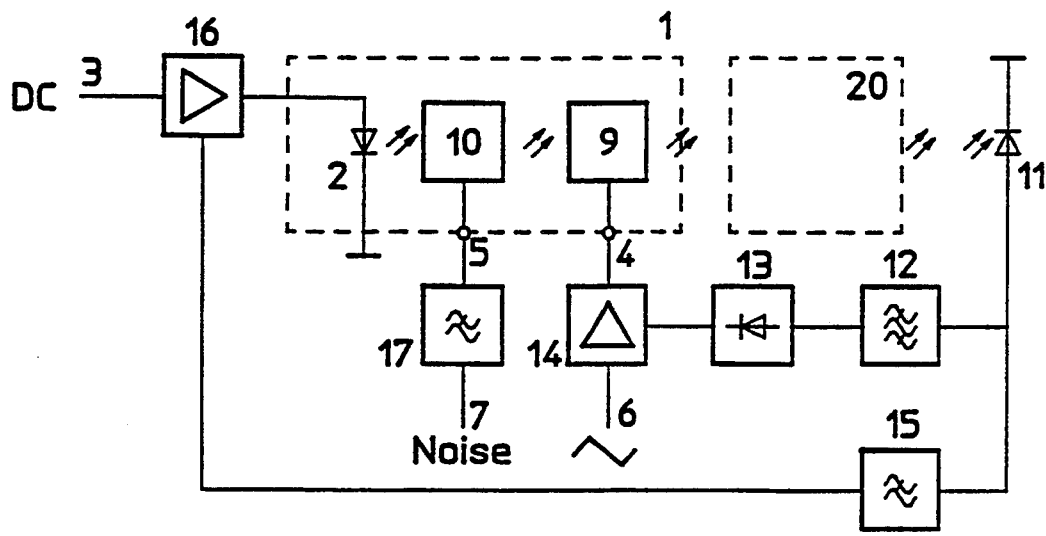
FIG. 2 shows a second optical noise source according to the invention.

The second optical noise source depicted in FIG. 2 comprises narrowband light source means 1 which comprise the narrowband light source 2, an optical modulator 10, which is optically coupled to the narrowband light source 2 and has a noise input 5, and an optical modulator 9 which is optically coupled (via the optical modulator 10) to the narrowband light source 2 and has a base input 4. The second optical noise source depicted in FIG. 2 further comprises the interference filter 20, based on path length difference, for receiving the modulated optical signal and for generating the optical composition signal. The cathode of the narrowband light source 2 is connected to ground, and the anode is connected to an output of an adjustable amplifier/attenuator circuit 16, of which an input forms the power input 3. Said second optical noise source is also equipped with an optical detector 11 such as, for example, a photodiode with associated electronics, for detecting at least part of the optical composition signal. Optical detector 11 is coupled to a low-pass filter 15 which is coupled to a control input of the adjustable amplifier/attenuator circuit 16 and is coupled, via a bandpass filter 12, to an input of an electrical detector 13, of which an output is coupled to a control input of an adjustable amplifier/attenuator circuit 14. An output of adjustable amplifier/attenuator circuit 14 is connected to the base input 4, and an input of adjustable amplifier/attenuator circuit 14 forms a further base input 6 for receiving the electrical periodic signals. Said second optical noise source further comprises a low-pass filter 17 which is situated between the noise input 5 and a further noise input 7 for receiving the noise signal.

By means of the DC signal to be fed to power input 3, the power of the light source 2 is adjusted via the adjustable amplifier/attenuator circuit 16 which itself is adjusted via the control input. In so doing, an increase in the signal power level detected by the photodiode 11 should result in an increase in the attenuation or a decrease in the gain of the adjustable amplifier/attenuator circuit 16, and a decrease in the signal power level detected by the photodiode 11 should result in a decrease in the attenuation or an increase in the gain of the adjustable amplifier/attenuator circuit 16 (i.e. negative feedback). Such a feedback results in stabilization of the optical power level generated by the narrowband light source 2.

By means of the optical modulator 10, the optical signal generated by the narrowband light source 2 is frequency-modulated with the noise signal, which, as reported earlier, makes it possible to shorten considerably the path length difference in the interference filter 20. By limiting the frequency of the noise signal by means of the low-pass filter 17, the concentration of noise power in the chosen noise bandwidth increases, as a result of which the noise power is handled more efficiently and less noise power is wasted outside the chosen noise bandwidth.

By means of the optical modulator 9, the optical signal, which has already been frequency-modulated with the noise signal, is further frequency-modulated with the periodic signal which is fed in via the adjustable amplifier/attenuator circuit 14. The latter is adjusted via the control input itself by means of the signal coming from the detector 13 (such as, for example, a top detector, a power detector or a true root mean square detector). In so doing, a decrease in the signal power level detected by the photodiode 11 in a specified frequency band should result in an increase in the attenuation or a decrease in the gain of the adjustable amplifier-/attenuator circuit 14, and an increase in the signal power level in this frequency band detected by the photodiode 11 should result in a decrease in the attenuation or an increase in the gain of the adjustable amplifier/attenuator circuit 14 (i.e. positive feedback). Such a feedback results in stabilization of the spectral noise density of the signal detected by the photodiode 11. Instead of a bandpass filter 12 it would also be possible to use a high-pass filter, if the bandwidth of photodiode 11 with the associated electronics or of detector 13 is significantly lower than the noise bandwidth.

Feeding in a triangular electrical periodic signal in comparison results in a sinusoidal electrical periodic signal having an amplitude comparable to an electrical photodiode noise signal which can be regarded as flat over a larger part of the noise bandwidth.

It should be noted that the sequential order of the two optical modulators 9, 10 is completely arbitrary. It would further be possible to combine the two optical modulators 9, 10 into one optical modulator having one input, which input, as depicted in FIG. 1, is fed with the noise signal and the periodic signal via capacitors.

Both adjustable amplifier/attenuator circuits 14, 16 can be implemented in a manner known to those skilled in the art, using, for example, commercially available ICs. Since the adjustment of the periodic signal can take place not only on the basis of amplitude variation, but, for example, also on the basis of frequency variation, the adjustable amplifier/attenuator circuit 14 could in that case be implemented, in a manner known to those skilled in the art, using an adjustable frequency filter. Amplifier/attenuator circuit 16 could obviously also be embodied, in a manner known to those skilled in the art, as an addition or subtraction circuit.

Figure 3:
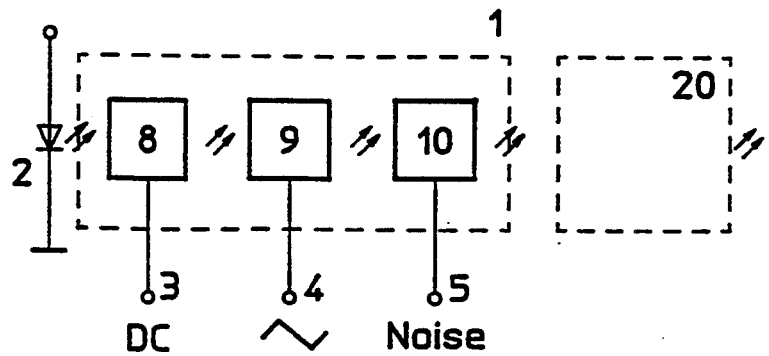
FIG. 3 shows a third optical noise source according to the invention.

The third optical noise source depicted in FIG. 3 comprises narrowband light source means 1 which are equipped with an optical modulator 8 having a power input 3 for receiving the DC signal for amplitude modulation of an optical signal coming from the narrowband light source 2, with the optical modulator 9 having the base input 4 for receiving the electrical periodic signal, and with the optical modulator 10 having the noise input 5 for receiving the noise signal. The sequential order of the three optical modulators 8, 9, 10 is again completely arbitrary, and both optical modulators 9, 10 could be combined into one optical modulator having one input, which input, as depicted in FIG. 1, is fed with the noise signal and the periodic signal via capacitors. Said third optical noise source further comprises the interference filter 20.

Apart from the fact that the third optical noise source depicted in FIG. 3 is not itself equipped with the narrowband light source 2, but only needs to be fed with the optical signal thereof, and the power level of said optical signal is controlled via the optical modulator 8, the mode of operation is otherwise in accordance with the first optical noise source depicted in FIG. 1 and the second optical noise source depicted in FIG. 2, it obviously being possible to use, in the case of said third optical noise source, both feedbacks, low-pass filter 17 and sinusoidal or triangular periodic signals. In so doing, the same measurement setup (third optical noise source) can be employed at different optical frequencies by replacing the external narrowband light source 2 by a different specimen having a different optical frequency.

I claim:

1. Optical noise source comprising
   narrowband light source means for generating a modulated optical signal and provided with a base input for receiving an electrical periodic signal for modulating a narrowband optical signal, and
   an interference filter, based on path length difference, for receiving the modulated optical signal and for generating an optical composition signal, characterized in that the narrowband light source means are provided with a noise input for receiving an electrical noise signal.

2. Optical noise source according to claim 1, characterized in that a bandwidth of the electrical noise signal is smaller than a frequency of the electrical periodic signal.

3. Optical noise source according to claim 1, characterized in that the electrical periodic signal is triangular.

4. Optical noise source according to claim 1, characterized in that the optical noise source comprises an optical detector for detecting at least a part of the optical composition signal, which optical detector is coupled, via a filter, to an input of the narrowband light source means.

5. Optical noise source according to claim 4, characterized in that the filter is a high-pass or bandpass filter with which an electrical detector is cascaded for controlling the electrical periodic signal, the input of the narrowband light source means being the base input.

6. Optical noise source according to claim 4, characterized in that the filter is a low-pass filter for regulating a power level of the optical signal, the input of the narrowband light source means being a power input.

7. Optical noise source according to claim 1, characterized in that the narrowband light source means comprise an optical input for receiving the narrowband optical signal.

8. Optical noise source according to claim 7, characterized in that the narrowband light source means comprise an optical modulator which is optically coupled to the optical input and of which an input forms the base input.

9. Optical noise source according to claim 7, characterized in that the narrowband light source means comprise an optical modulator which is optically coupled to the optical input and of which an input forms the noise input. 10.

10. Optical noise source according to claim 7, characterized in that the narrowband light source means comprise an optical amplitude modulator which is optically coupled to the optical input and of which an input forms a power input.

11. Optical noise source according to claim 1, characterized in that the narrowband light source means comprise a narrowband light source for generating the narrowband optical signal.

12. Optical noise source according to claim 11, characterized in that the narrowband light source means comprise an optical modulator which is optically coupled to the narrowband light source and of which an input forms the base input.

13. Optical noise source according to claim 11, characterized in that the narrowband light source means comprise an optical modulator which is optically coupled to the narrowband light source and of which an input forms the noise input.

14. Optical noise source according to claim 11, characterized in that the narrowband light source means comprise an optical amplitude modulator which is optically coupled to the input of the narrowband light source and of which an input forms a power input.

15. Optical noise source according to claim 11, characterized in that the narrowband light source is provided with an input which forms the base input.

16. Optical noise source according to claim 11, characterized in that the narrowband light source is provided with an input which forms the noise input.

17. Optical noise source according to claim 11, characterized in that the narrowband light source is provided with an input which forms a power input.

* * * * *